US012505728B2

(12) United States Patent
Van Veen et al.

(10) Patent No.: US 12,505,728 B2
(45) Date of Patent: Dec. 23, 2025

(54) MOTIONLESS PERSON DETECTION SYSTEM

(71) Applicant: RYALEX HOLDINGS PTY LTD, Kirrawee (AU)

(72) Inventors: Ron Van Veen, Kirrawee (AU); Ryan Van Veen, Kirrawee (AU)

(73) Assignee: RYALEX HOLDINGS PTY LTD, Kirrawee (AU)

( * ) Notice: Subject to any disclaimer, the term of this patent is extended or adjusted under 35 U.S.C. 154(b) by 187 days.

(21) Appl. No.: 18/548,858

(22) PCT Filed: Mar. 8, 2022

(86) PCT No.: PCT/AU2022/050189
§ 371 (c)(1),
(2) Date: Sep. 1, 2023

(87) PCT Pub. No.: WO2022/187894
PCT Pub. Date: Sep. 15, 2022

(65) Prior Publication Data

US 2024/0169819 A1 May 23, 2024

(30) Foreign Application Priority Data

Mar. 8, 2021 (AU) ................................ 2021900645

(51) Int. Cl.

*G08B 21/02* (2006.01)
*G08B 21/04* (2006.01)
*G08B 21/18* (2006.01)

(52) U.S. Cl.

CPC ..... *G08B 21/0415* (2013.01); *G08B 21/0469* (2013.01); *G08B 21/0492* (2013.01); *G08B 21/182* (2013.01)

(58) Field of Classification Search

CPC ........ G16H 40/67; G16H 20/00; G16H 20/30; G16H 40/63; G16H 50/20; G16H 50/30;
(Continued)

(56) References Cited

U.S. PATENT DOCUMENTS

2007/0229252 A1* 10/2007 Collins .................. G08B 21/02 340/539.13
2008/0265799 A1* 10/2008 Sibert .................. H05B 47/197 315/292
(Continued)

FOREIGN PATENT DOCUMENTS

CN 203812369 U 9/2014
GB 2535649 A 8/2016
(Continued)

OTHER PUBLICATIONS

International Search Report & Written Opinion dated May 17, 2022 from PCT Application No. PCT/AU2022/050189.
(Continued)

*Primary Examiner* — Daniel Previl
(74) *Attorney, Agent, or Firm* — INNOVATION CAPITAL LAW GROUP, LLP; Vic Lin

(57) ABSTRACT

A motionless person detection system has a door sensor for operably interfacing a door of an enclosed space. The system also has a motion sensor for detecting motion within the enclosed space. A controller operably interfaces the door sensor and the motion sensor. The controller is configured to reliably detect a motionless person using signals received from the door sensor and the motion sensor whilst eliminating or reducing false positives. The system has particular application for toilet facilities of private residences, retirement homes, gyms, public buildings, charter vessels and the
(Continued)

like where occupants thereof may experience a medical episode and wherein rapid alerting and fast medical emergency response is required.

15 Claims, 1 Drawing Sheet

(58) Field of Classification Search

CPC ........ G16H 50/70; G16H 10/00; G16H 15/00; G16H 30/00; G16H 40/00; G16H 50/00; G16H 70/00; G16H 80/00; F21V 23/0442; F21V 1/00; F21V 3/00; F21V 5/00; F21V 7/00; F21V 9/00; F21V 11/00; F21V 13/00; F21V 14/00; F21V 15/00; F21V 17/00; F21V 19/00; F21V 21/00; F21V 23/00; F21V 25/00; F21V 27/00; F21V 29/00; F21V 31/00; F21V 33/00; F21V 35/00; F21V 36/00; F21V 37/00; F21V 99/00; F21V 2200/00; H05B 41/2985; H05B 47/13; H05B 1/00; H05B 3/00; H05B 6/00; H05B 7/00; H05B 11/00; H05B 31/00; H05B 33/00; H05B 35/00; H05B 39/00; H05B 41/00; H05B 44/00; H05B 45/00; H05B 46/00; H05B 47/00; H05B 2203/00; H05B 2206/00; H05B 2213/00; H05B 2214/00; Y02B 10/00; Y02B 20/00; Y02B 30/00; Y02B 40/00; Y02B 50/00; Y02B 70/00; Y02B 80/00; Y02B 90/00; Y02B 20/40; A61B 2562/0219; A61B 5/0022; A61B 5/0024; A61B 5/02055; A61B 5/024; A61B 5/1117; A61B 5/1118; A61B 5/4809; A61B 5/4812; A61B 5/6802; A61B 5/6892; A61B 5/7264; A61B 1/00; A61B 3/00; A61B 5/00; A61B 6/00; A61B 7/00; A61B 8/00; A61B 9/00; A61B 10/00; A61B 13/00; A61B 16/00; A61B 17/00; A61B 18/00; A61B 2576/00; A61B 2562/00; A61B 2560/00; A61B 2505/00; A61B 2503/00; G04G 13/021; G04G 3/00; G04G 5/00; G04G 7/00; G04G 9/00; G04G 11/00; G04G 13/00; G04G 15/00; G04G 17/00; G04G 19/00; G04G 21/00; G04G 99/00; Y02D 30/70; Y02D 10/00; Y02D 30/00; H04W 4/38; H04W 4/80; H04W 52/0216; H04W 52/0254; G08B 21/0216; G08B 21/0446; G08B 21/06; G08B 23/00; G08B 25/001; G08B 25/009; G08B 25/10; G08B 21/0415; G08B 21/0469; G08B 21/0492; G08B 21/088; G08B 21/182; H04N 2101/00; H04N 23/611; H04N 23/71

USPC .... 340/573.1, 469, 473, 477, 482, 485, 517, 340/527, 534, 538.15, 539.13, 539.22, 340/545.1, 545.6–545.9, 568.2, 588

See application file for complete search history.

(56) References Cited

U.S. PATENT DOCUMENTS

| | | | | |
|---|---|---|---|---|
| 2011/0037585 | A1* | 2/2011 | Wang | B60R 25/1004 340/669 |
| 2014/0054976 | A1* | 2/2014 | Ni | F24F 11/66 307/116 |
| 2020/0077892 | A1* | 3/2020 | Tran | G08B 21/02 |
| 2022/0122431 | A1* | 4/2022 | Barton | G06T 7/11 |

FOREIGN PATENT DOCUMENTS

| | | | |
|---|---|---|---|
| JP | 2005301778 | A | 10/2005 |
| JP | 3198436 | U | 7/2015 |
| JP | 2016218773 | A | 12/2016 |
| WO | 2001024133 | A1 | 4/2001 |

OTHER PUBLICATIONS

Ryu, Toshin, et al., "Sensing Technologies for In-Home Monitoring of People with Dementia", Proceedings of the 3rd IIAE International Conference on Intelligent Systems and Image Processing, 2015, pp. 84-91.

* cited by examiner

MOTIONLESS PERSON DETECTION SYSTEM

FIELD OF THE INVENTION

This invention relates generally to a system configured for detecting motionless persons within confined spaces, such as toilet cubicles.

SUMMARY OF THE DISCLOSURE

The present system comprises a door sensor for interfacing a door enclosing an enclosed space, such as a toilet cubicle or the like. The system further comprises a motion sensor for detecting motion within the enclosed space.

The system has a controller operably coupled to the door sensor and the motion sensor. The controller is configured in specific ways as described herein for reliable motionless person detection whilst reducing or eliminating false positive alerting.

The system has particular application for toilet facilities of private residences, retirement homes, gyms, public buildings, charter vessels and the like where occupants thereof may experience a medical episode and wherein rapid alerting thereof is desirous. The present system allows for faster responses to medical emergencies.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
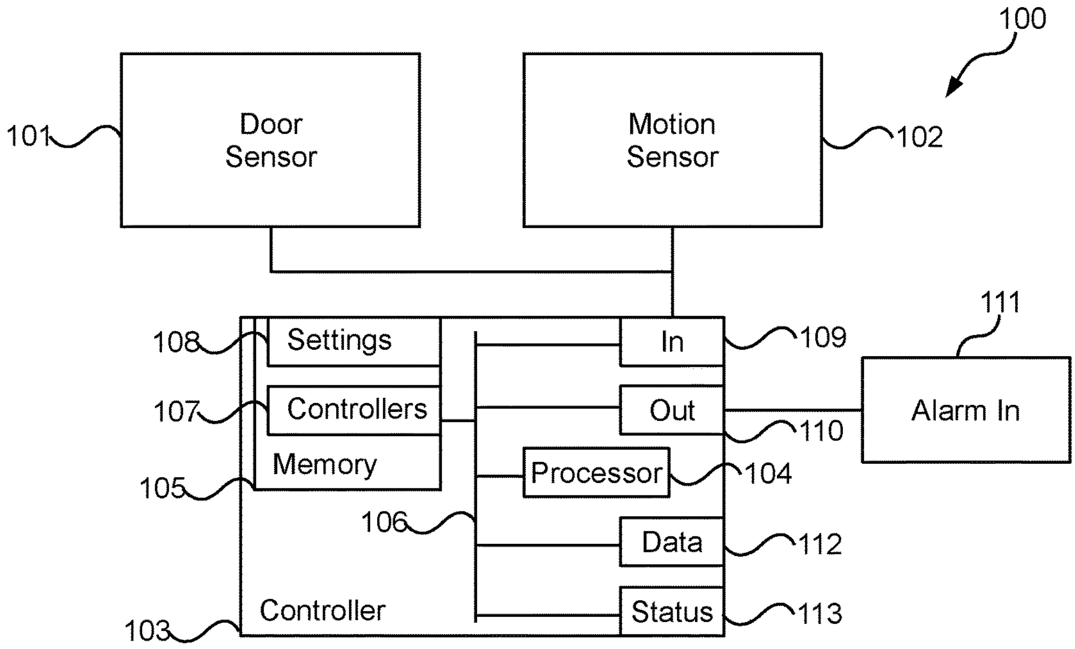
FIG. 1 shows a motionless person detection system in accordance with an embodiment.

A motionless person detection system 100 comprises a door sensor 101 operably interfacing a door enclosing an enclosed space such as a toilet cubicle or the like. The system 100 further comprises a motion sensor 102 for detecting motion within the enclosed space. The system 100 comprises a controller 103 operably coupled to the door sensor 101 of the motion sensor 102.

Whereas the controller 103 may be an analogue controller, in the embodiment shown, the controller 103 is a programmable digital controller. In this regard, the controller 103 comprises a processor 104 for processing digital data. A memory device 105 is in operable communication with the processor 104 via a system bus 106 and is configured for storing digital data including computer program code instructions. In use, the processor 104 fetches these computer program code instructions and associated data for interpretation and execution of the functionality provided herein.

The computer program code instructions may be logically divided into a plurality of controllers 107. The memory 105 may store settings 108 used by the controllers 107 to adjust the operation of the controller 103.

The controller 103 may comprise an input interface 109 for interfacing with the door sensor 101 and motion sensor 102. The interface 109 may include both wired and/or wireless connectivity.

In embodiments, the door sensor 101 and motion sensor 102 has an output that goes high (i.e. voltage threshold or current loop threshold) when detecting closing of the door or motion respectively. In this regard, the input interface 109 may detect high outputs from the door sensor 101 and motion sensor 102.

The door sensor 101 may take various forms including a contact switch, magnetically activated proximity switch (such as a reed switch, hall effect switch or the like), light beam interrupt/reflection switch and the like.

The motion sensor 102 may be a passive infrared sensor. However, in other embodiments, the motion sensor 102 may include ultrasonic, reflective, image processing and/or microwave motion sensors.

In embodiments, the motion sensor 102 comprises both a passive infrared motion sensor and a microwave motion sensor either of which may be selected (such as by way of user-configurable DIP switches or setting 108) for operation, either alone or in combination depending on the operational environment.

The controller 103 may have an alarm signal output 110 which may go high when detecting a motionless person. The output 110 may be operably coupled to an alarm input 111. Various forms of alarms 111 may be used, including an audible siren, strobe light and or the like. In embodiments, the alarm input 111 may cause the sending of an electronic notification, such as an SMS message or the like.

In embodiments, the controller 103 comprises a data interface 112. The data interface 112 may be a short-range data interface such as a Wi-Fi or Bluetooth data interface. In use, the controller 103 may be configured using a mobile computing device in operable communication with the data interface 112. Specifically, the mobile communication device may communicate with the data interface 112 to adjust various settings 108 within the memory 105 of the controller 103, including timer settings.

In embodiments, controller 103 may be configured to be configurable by the mobile communication device (including setting of the settings 108) within 10 minutes of power up via the data interface 112.

The controller 103 may comprise a status indicator 113, such as one comprising LED indicator lights indicating the operational status of the controller 103. For example, the status indicator 113 may indicate that the controller 103 has not been configured, is currently being programmed or configured, is operational and/or at various detection stages.

In embodiments, the motion sensor 102 may be provided in a small form factor housing which may be adhered to a ceiling above the enclosure (or other locations, such as the back of the cubicle door) and from which a cable is run to connect to the door sensor 101. The door sensor 101 may similarly be provided in a small form factor housing. The controller 103 may locate either within the housing of the door sensor 101 or the motion sensor 102, but preferably is located within the housing of the motion sensor 102 which has less size constraints as compared to that of the door sensor 101. The system 100 may be powered by battery or alternatively draw power from mains supply if available.

In alternative embodiments, the controller 103 interfaces an RF receiver to receive wireless signals transmitted from an RF transmitter interfacing the door sensor 101 or the motion sensor 102 to negate the need of running cables.

In a preferred embodiment, the controller 103 and the motion sensor 102 locate within small form factor housing and which receive the wireless signals from an RF transmitter of the door sensor 101. In this regard, the door sensor 101 is preferably a wireless battery operated 433 Mhz device.

In embodiments, in addition to transmitting door status indications (i.e. door open and door closed indications) the door sensor 101 may wirelessly transmit a battery low indication to the wireless receiver of the controller 103 when the battery of the door sensor 101 is low. In this regard, the controller 103 may further comprise a door sensor battery low output.

A number of controllers 100 may be adhered to respective toilet doors within a bathroom and a mobile communication device (such as a mobile phone device executing a software application thereon) used to program each controller 100 in turn. In this regard, the status indicator 113 may indicate which of the controllers 103 is currently being configured.

Figure 2:
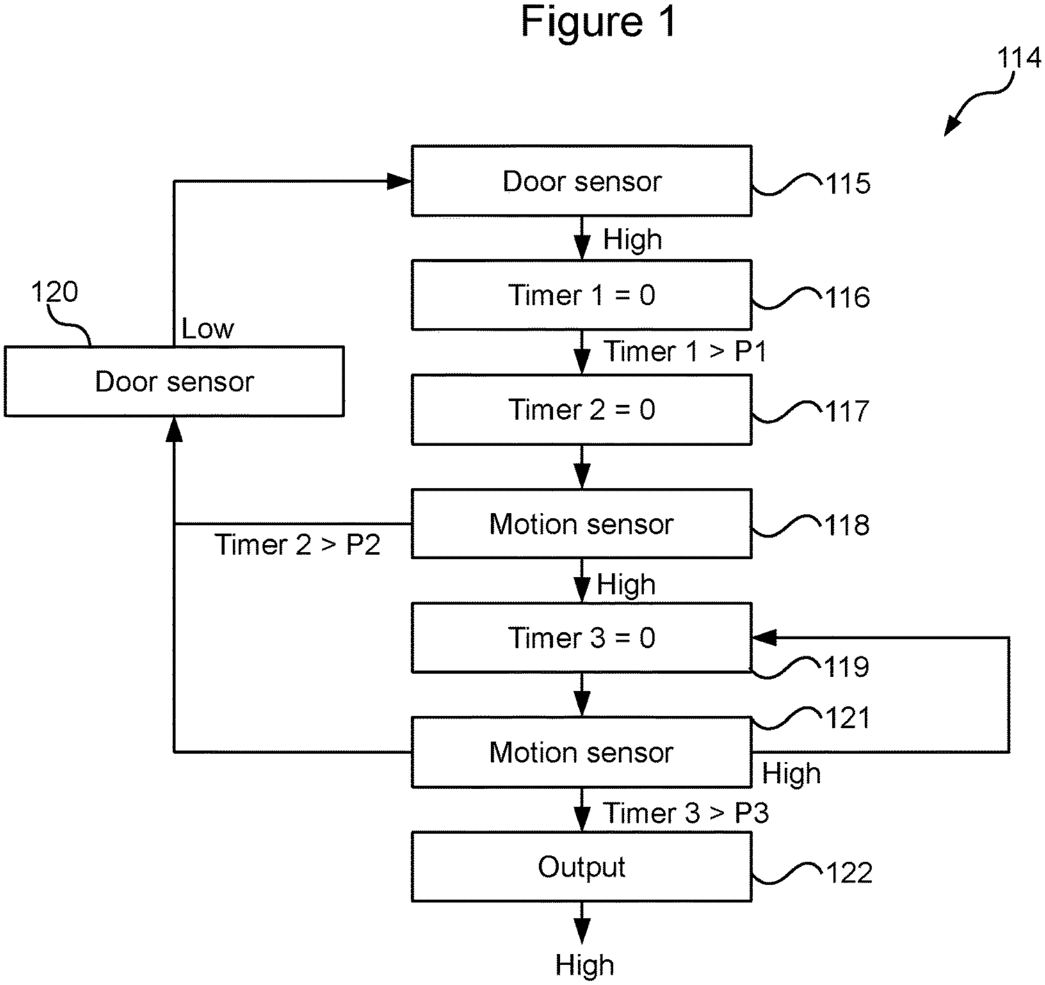
FIG. 2 shows exemplary processing by the system of Figure numeral one.

FIG. 2 shows exemplary processing 114 by the system 100.

At step 115, the controller 103 detects the output of the door sensor 101 going high. In other words, the controller 103 detects that the cubicle door is being closed.

At step 116, the controller 103 may set a first timer to wait for a short time period, such as approximately five seconds before moving to the next step 117 to allow the output of the motion sensor 102 to stabilise. In other words, when closing the cubicle door, the motion sensor 102 may detect the motion of the door wherein the output of the motion sensor 102 may remain high for a few seconds, such as approximately three seconds.

As such, the first timer may be used to wait for a time period greater than the output duration of the motion sensor 102 to thereby exclude motion detected by the closing of the door itself. As alluded to above, the settings 108 of the controller 103 may be configured to adjust the first time and duration which may depend on the type of motion sensor 102 used.

At step 117, the controller 103 may set a second timer. The second timer is used to distinguish whether a person has entered the cubicle after the door is closed.

The second timer may be approximately five seconds during which, at step 118, the controller 103 determines if the output of the motion sensor 102 goes high.

As shown in FIG. 2, if the output of the motion sensor 102 is detected as going high, the controller 103 may progress to step 119. However, if the second timer exceeds a threshold P2 (such as approximately five seconds), the controller 103 may reset wherein the controller 103 waits for the output of the door sensor 101 to go low at step 120 (i.e. indicative of the cubicle door being opened again) whereafter the process repeats from step 115.

However, should the controller 103 detect motion within the cubicle using the motion sensor 102 at step 118, the controller 103 may set a third timer at step 119. The third timer 119 is used to detect lack of motion and therefore the third timer is used to time a longer time period, such as approximately more than three minutes, preferably approximately five minutes, at step 121.

Specifically, at step 121, should the output of the motion sensor 102 go high (i.e. motion detected), the controller 103 may reset the third timer by progressing back to step 119.

Furthermore, should the output of the door sensor 101 go low at step 120 (i.e. indicative of the door being opened), the controller 103 may reset back to step 115.

However, should the timer exceed a threshold P3 (such as approximately five minutes) without the output of the motion sensor going high, the controller 103 may progress to step 122 wherein the output 110 is set to high to output an alarm signal via the output 110 indicative of a motionless person.

In embodiments, the controller 103 may output an audible warning signal before outputting the alarm.

Specifically, the controller 103 may set a fourth timer having a shorter duration than that of the third timer. If the fourth timer is exceeded without the motion sensor 102 output going high, the controller 103 may output the audible warning to warn the user. For example, the controller 103 may interface a buzzer or the like which may output an audible cue for the occupant. For example, a user within a toilet cubicle may sit relatively motionless while browsing a mobile phone device wherein the audible cue may cause the user to look up, a motion detectable by the motion sensor 118 to then reset the timer at step 119.

In embodiments, the controller 103 sets a fifth timer which is used to output a warning signal when the cubicle has been occupied for too long, such as in excess of 15 minutes for example.

In the embodiment shown, the controller 103 has a respective dedicated door sensor 101 and motion sensor 102. However, in embodiments, the controller 103 may interface more than one door sensor 101 and/or motion sensor 102. In other words, a single controller 103 may be provided in a bathroom and connected to separate door sensors 101 and motion sensors 102 in each cubicle.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

Whereas outputs of the various devices described herein is going high, it should be noted that the signal going low may alternatively be used. Indeed, signalling from the various devices, including the door sensor 101, motion sensor 102 and controller 103 may employ any of the types of signalling (including going high and/or low, digital and/or analogue) to indicate various states.

The invention claimed is:

1. A motionless person detection system comprising:

a door sensor for interfacing a door of an enclosed space;

a motion sensor for detecting motion within the enclosed space;

a controller operably interfacing the door sensor and the motion sensor, wherein the controller is configured to:

when in an initial state, detect closing of the door using the door sensor;

then, after waiting a first time period greater than an output duration of the motion sensor to exclude motion detected by a closing motion of the door, detect motion, over a second time period, within the enclosed space using the motion sensor, wherein a lack of detection of motion during the second time period reverts the controller to the initial state; and then, if motion is detected during the second time period, output an alarm signal if no motion is detected by the motion sensor within a third time period that begins when motion is detected, wherein the third time period is restarts if motion is detected by the motion sensor during the third time period, wherein the controller is further configured to output a warning signal if no motion is detected by the motion sensor within a fourth time period, the fourth time period being less than the third time period.

2. The system as claimed in claim 1, wherein the third time period is greater than 3 minutes.

3. The system as claimed in claim 1, wherein the second time period is approximately five seconds.

4. The system as claimed in claim 1, wherein the first time period is less than 10 seconds.

5. The system as claimed in claim 1, wherein the first time period is approximately 5 seconds.

6. The system as claimed in claim 1, wherein the controller is further configured to reset to the initial state when detecting the opening of the door using the door sensor.

7. The system as claimed in claim 1, wherein the controller comprises a memory device comprising settings specifying at least the time period and a data interface and wherein the settings are configurable via the data interface.

8. The system as claimed in claim 1, wherein the controller comprises a status indicator indicating various operational states of the controller and wherein at least one operational state indicates a configuration state of the controller.

9. The system as claimed in claim 1, wherein the motion sensor is in a small form factor housing and from which a cable is run to connect to the door sensor.

10. The system as claimed in claim 9, wherein the controller is located within the housing.

11. The system as claimed in claim 1, wherein the controller interfaces an RF receiver to receive wireless signals transmitted from an RF transmitter interfacing at least one of the door sensor and the motion sensor.

12. The system as claimed in claim 1, wherein the motion sensor and the controller are located in a small form factor housing and wherein the controller interfaces an RF receiver to receive wireless signals transmitted from an RF transmitter interfacing the door sensor.

13. The system as claimed in claim 12, wherein the door sensor is battery indicated and wherein the door sensor is configured to wirelessly transmit a battery low indication using the RF transmitter to the RF receiver of the controller.

14. The system as claimed in claim 1, wherein the motion sensor comprises both a passive infrared motion sensor and a microwave motion sensor either of which may be selected for operation.

15. A method of detecting a motionless person using the motionless person detection system of claim 1, the method comprising:

interfacing the door sensor to a door of an enclosed space; and locating the motion sensor to detect motion within the enclosed space.

* * * * *